United States Patent
Kang et al.

(10) Patent No.: US 9,897,716 B2
(45) Date of Patent: *Feb. 20, 2018

(54) VEHICLE-MOUNTED INSPECTION SYSTEM

(71) Applicants: TSINGHUA UNIVERSITY, Beijing (CN); NUCTECH COMPANY LIMITED, Beijing (CN)

(72) Inventors: Kejun Kang, Beijing (CN); Jingyu Gu, Beijing (CN); Zhiqiang Chen, Beijing (CN); Jianmin Li, Beijing (CN); Yuanjing Li, Beijing (CN); Yulan Li, Beijing (CN); Dongyu Wang, Beijing (CN)

(73) Assignees: TSINGHUA UNIVERSITY, Beijing (CN); NUCTECH COMPANY LIMITED, Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/841,991

(22) Filed: Sep. 1, 2015

(65) Prior Publication Data

US 2016/0061989 A1 Mar. 3, 2016

(30) Foreign Application Priority Data

Sep. 2, 2014 (CN) .......................... 2014 1 0443085

(51) Int. Cl.
*G01V 5/00* (2006.01)
(52) U.S. Cl.
CPC .......... *G01V 5/0066* (2013.01); *G01V 5/0016* (2013.01)
(58) Field of Classification Search
CPC ................................................... G01V 5/0016
See application file for complete search history.

(56) References Cited

U.S. PATENT DOCUMENTS

2010/0189226 A1* 7/2010 Kotowski .............. G01N 23/04
378/198
2011/0186739 A1* 8/2011 Foland ................. G01V 5/0008
250/360.1
(Continued)

FOREIGN PATENT DOCUMENTS

CN 101329285 12/2008
CN 101344597 1/2009
(Continued)

OTHER PUBLICATIONS

Written Opinion dated Feb. 6, 2016, for Chinese application No. PCT/CN2015/088732.
(Continued)

*Primary Examiner* — Casey Bryant
(74) *Attorney, Agent, or Firm* — Browdy and Neimark, PLLC

(57) ABSTRACT

A vehicle-mounted inspection system comprises: a chassis; a rotation mechanism disposed on the chassis; a first ray emission device connected to the rotation mechanism and configured to emit a ray; a first detection device connected to the rotation mechanism and configured to receive the ray emitted by the first ray emission device; and a second ray emission device connected to the rotation mechanism and configured to emit a ray. The rotation mechanism is configured to rotate the first ray emission device, the first detection device and the second ray emission device substantially around an upright axis between a retracted position and an operating position.

6 Claims, 6 Drawing Sheets

(56) References Cited

U.S. PATENT DOCUMENTS

2012/0033791 A1* 2/2012 Mastronardi ........ G01V 5/0033
378/87
2013/0028376 A1* 1/2013 Mastronardi ........ G01V 5/0008
378/57

FOREIGN PATENT DOCUMENTS

| CN | 101936925 | 1/2011 |
| CN | 102556185 | 7/2012 |
| JP | 2008298509 | 12/2008 |
| JP | 2012018000 | 1/2012 |
| JP | 2013064619 | 4/2013 |

OTHER PUBLICATIONS

International Search Report dated Feb. 6, 2016, for Chinese application No. PCT/CN2015/088732.
European Search Report dated Jan. 22, 2016, in corresponding application No. 15183367.0.

* cited by examiner

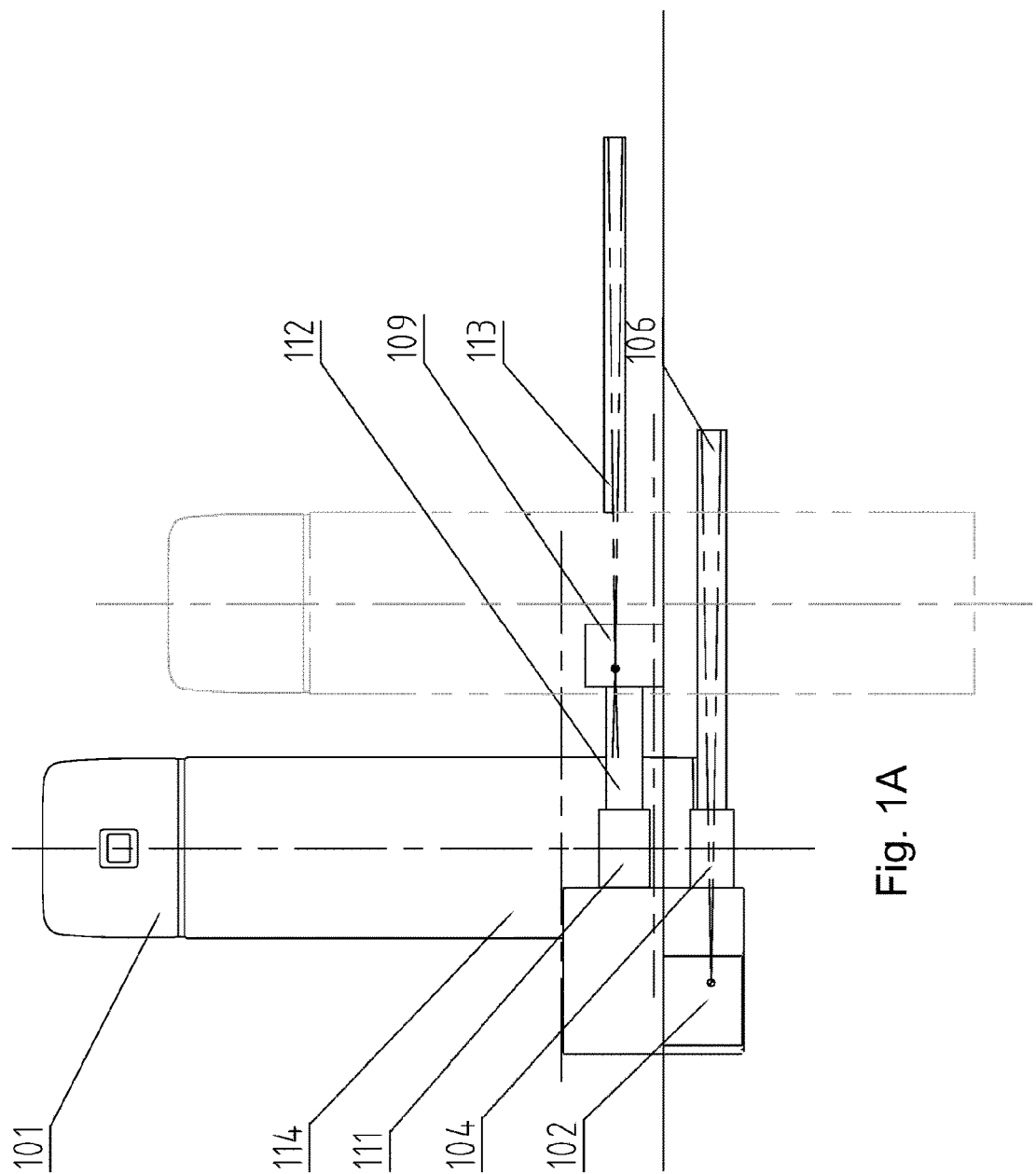

VEHICLE-MOUNTED INSPECTION SYSTEM

CROSS-REFERENCE TO RELATED APPLICATION

This application claims the benefit of Chinese Patent Application No. 201410443085.0 filed on Sep. 2, 2014 in the State Intellectual Property Office of China, the whole disclosure of which is incorporated herein by reference.

BACKGROUND

1. Technical Field

Embodiments of the present invention relate to a vehicle-mounted inspection system.

2. Description of the Related Art

A vehicle-mounted inspection system can perform safety inspections of cargos and vehicles conveniently. Radiation imaging technology is a nondestructive security inspection technology in which rays with penetrating ability emitted from a ray source are irradiated onto an object to be inspected. These rays pass through the object and are scattered by the object, then are acquired by ray-sensitive detection elements, and then photoelectric conversion and analog-digital conversion are performed, so as to achieve a transmission or scatter image of the object at a certain angle. Generally, a radiation imaging apparatus is provided with a set of ray sources and a set of detectors respectively located on both sides of the object. Rays are emitted from the ray source and pass through the object from one side thereof and reach the detector, to achieve only a transmission image of the object in one direction along which image superposition of the object may occur. Such superposition can be an image superposition of a single object in the same direction or an image superposition of several objects in the same direction. As a result, it is hard to accurately acquire real information for the object to be inspected. In order to solve this problem, new technologies, including computed tomography (CT) scan, single radiation source dual-view, stationary type dual radiation source dual-view, backscatter and the like, have developed in the field of radiation imaging. Computed tomography (CT) scan technology is widely applied in industrial nondestructive inspection departments and the medical profession, however, it requires complex electromechanical equipment, high installation requirement, high manufacturing cost, demand of relative displacements, between an imaging device and an object to be inspected, with multiple-angle and high accuracy, and, a relatively long inspection time. It is difficult to be moved in a vehicle-mounted manner, and thus it cannot perform mobile, rapid and economic security inspection on a large-size object. Single radiation source dual-view technology adopts a single radiation source and two collimators positioned at an angle relative to each other to form two ray sectors with a small angle. Rays pass through an object from one side thereof and reach the detector, to achieve a transmission image of the object in one side direction but two angles. It is difficult to completely solve the problems of image superposition of the object. Backscatter technology is mainly used to obtain superficial image information of an object, but it cannot achieve a transmission image of a large-size and heavy object.

SUMMARY

Embodiments of the present invention provide a vehicle-mounted inspection system comprising: a chassis; a rotation mechanism disposed on the chassis; a first ray emission device connected to the rotation mechanism and configured to emit a ray from one side of an object under inspection towards the other side of the object under inspection; a first detection device connected to the rotation mechanism and configured to receive the ray emitted by the first ray emission device; and a second ray emission device connected to the rotation mechanism and configured to emit a ray from above the object downwards towards a ground surface; wherein the rotation mechanism is configured to rotate the first ray emission device, the first detection device and the second ray emission device substantially around an upright axis between a retracted position and an operating position.**

In accordance with an embodiment of the present invention, the vehicle-mounted inspection system further comprises: a first elevating mechanism connected to the rotation mechanism and configured to lift up and down the first detection device.

In accordance with an embodiment of the present invention, the vehicle-mounted inspection system further comprises: a second elevating mechanism connected to the rotation mechanism and configured to lift up and down the second ray emission device.

In accordance with an embodiment of the present invention, the rotation mechanism comprises: a rotary member; and a driving member configured to drive the rotary member to rotate around the upright axis, wherein the first ray emission device, the first detection device and the second ray emission device are connected to the rotary member.

In accordance with an embodiment of the present invention, the second ray emission device comprises a second ray source arm and a second ray source disposed to the second ray source arm, wherein the second ray source arm is elevated by the second elevating mechanism and is rotated to the operating position by the rotation mechanism so as to enter an operational state.

In accordance with an embodiment of the present invention, the first detection device comprises a traverse detector arm and a upright detector arm, and a plurality of detectors disposed to the transverse detector arm and the upright detector arm, wherein in the operational state, the transverse detector arm and the upright detector arm are formed in a substantially inverted L shape.

In accordance with an embodiment of the present invention, the transverse detector arm is elevated by the first elevating mechanism and is rotated to the operating position by the rotation mechanism so as to enter an operational state.

In accordance with an embodiment of the present invention, the vehicle-mounted inspection system further comprises: a second detection device disposed on a ground surface and configured to receive the ray emitted by the second ray emission device.

In accordance with an embodiment of the present invention, the second detection device comprises a plate type detector.

In accordance with an embodiment of the present invention, the vehicle-mounted inspection system further comprises: a chamber disposed on a front side of the rotation mechanism on the chassis, wherein in the retracted position, the first detection device and the second ray emission device are placed on a top of the chamber and are spaced from each other in a transverse direction of the chassis.

BRIEF DESCRIPTION OF THE DRAWINGS

FIG. 1A is a schematic top view of a vehicle-mounted inspection system according to an embodiment of the present invention, in a scanning state.

DETAILED DESCRIPTION OF THE EMBODIMENTS

Figure 1B:
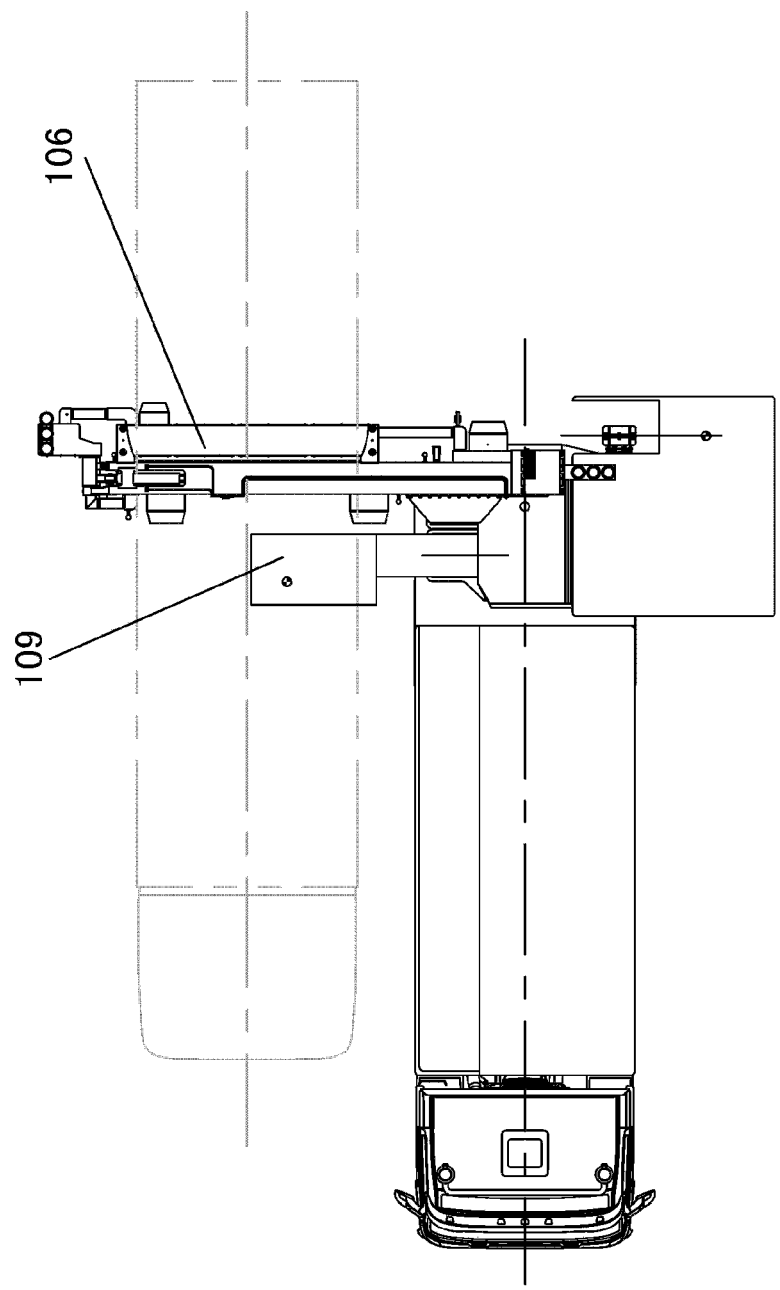
FIG. 1B is a schematic top view of the vehicle-mounted inspection system according to the embodiment of the present invention, in the scanning state, in which specific structures of components are shown.
Figure 2:
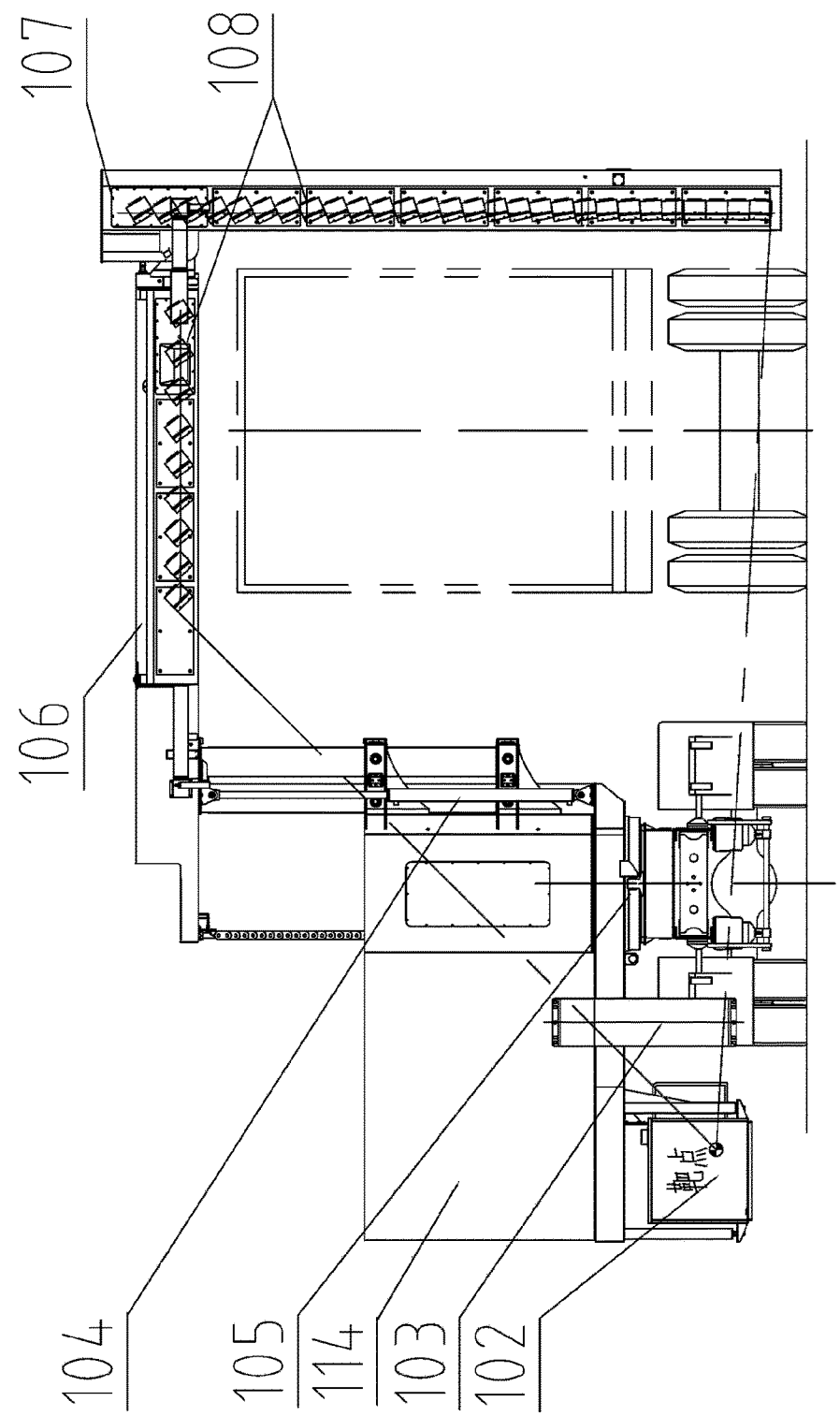
FIG. 2 is a schematic front view of a first imaging device of the vehicle-mounted inspection system according to an embodiment of the present invention, in the scanning state.

A further description of the invention will be made in detail as below with reference to embodiments of the present invention taken in conjunction with the accompanying drawings.

Referring to FIGS. 1A-5, a vehicle-mounted inspection system according to an embodiment of the present invention comprises: a chassis 1011; a rotation mechanism 105 disposed on the chassis 1011; a first ray emission device connected to the rotation mechanism 105 and configured to emit a ray from one side of an object under inspection towards the other side of the object under inspection; a first detection device connected to the rotation mechanism 105 and configured to receive the ray emitted by the first ray emission device; and a second ray emission device connected to the rotation mechanism 105 and configured to emit a ray from above the object to be examined in a direction downwards towards the ground surface. The rotation mechanism 105 is configured to rotate the first ray emission device, the first detection device and the second ray emission device substantially around an upright axis between a retracted position and an operating position. The chassis 1011 may comprise a chassis of a vehicle 101, or a separate trailer dragged by a vehicle. The vehicle 101 may comprise a chassis truck or a trailer truck.

Referring to FIGS. 1A-5, the first ray emission device comprises a first ray source 102 and a first collimator 103; and the second ray emission device comprises a second ray source arm 112 and a second ray source 109 and a second collimator 110 disposed to the second ray source arm. The first detection device comprises a first traverse detector arm 106, a first upright detector arm 107, and a plurality of first detectors 108 disposed to the first transverse detector arm 106 and the first upright detector arm 107. In addition, the ray source may comprise an X-ray source, a gamma ray source, a neutron ray source, and the like. A first imaging device formed by the first ray emission device and the first detection device is configured to acquire a side-looking image of an object under inspection.

Referring to FIGS. 1A-5, the rotation mechanism 105 comprises: a rotary member; and a driving member configured to drive the rotary member to rotate around the upright axis, wherein the first ray emission device, the first detection device and the second ray emission device are connected to the rotary member. The rotation mechanism 105 may comprise an internal gear connected to the rotary member. The internal gear is driven to rotate through a pinion gear by an electric motor, thereby rotating the rotary member.

Referring to FIGS. 1A-5, the vehicle-mounted inspection system further comprises: a first elevating mechanism 104 connected to the rotation mechanism 105 and configured to lift up and down the first detection device and a second elevating mechanism 111 connected to the rotation mechanism 105 and configured to raise and lower the second ray emission device. In the present embodiment, the first transverse detector arm is elevated by the first elevating mechanism 104 and is rotated to the operating position by the rotation mechanism 105 so as to enter an operational state. The second ray source arm 112 is elevated by the second elevating mechanism 111 and is rotated to the operating position by the rotation mechanism 105 so as to enter an operational state. In the operational state, the first transverse detector arm and the first upright detector arm are formed in a substantially inverted L shape. The object under inspection is inspected by passing it between the first ray emission device and the first upright detector arm. The elevating mechanism may comprise a hydraulic cylinder, a screw-and-nut mechanism or any other appropriate mechanism.

Alternatively, the elevating mechanism may not be provided in some embodiments.

Figure 3:
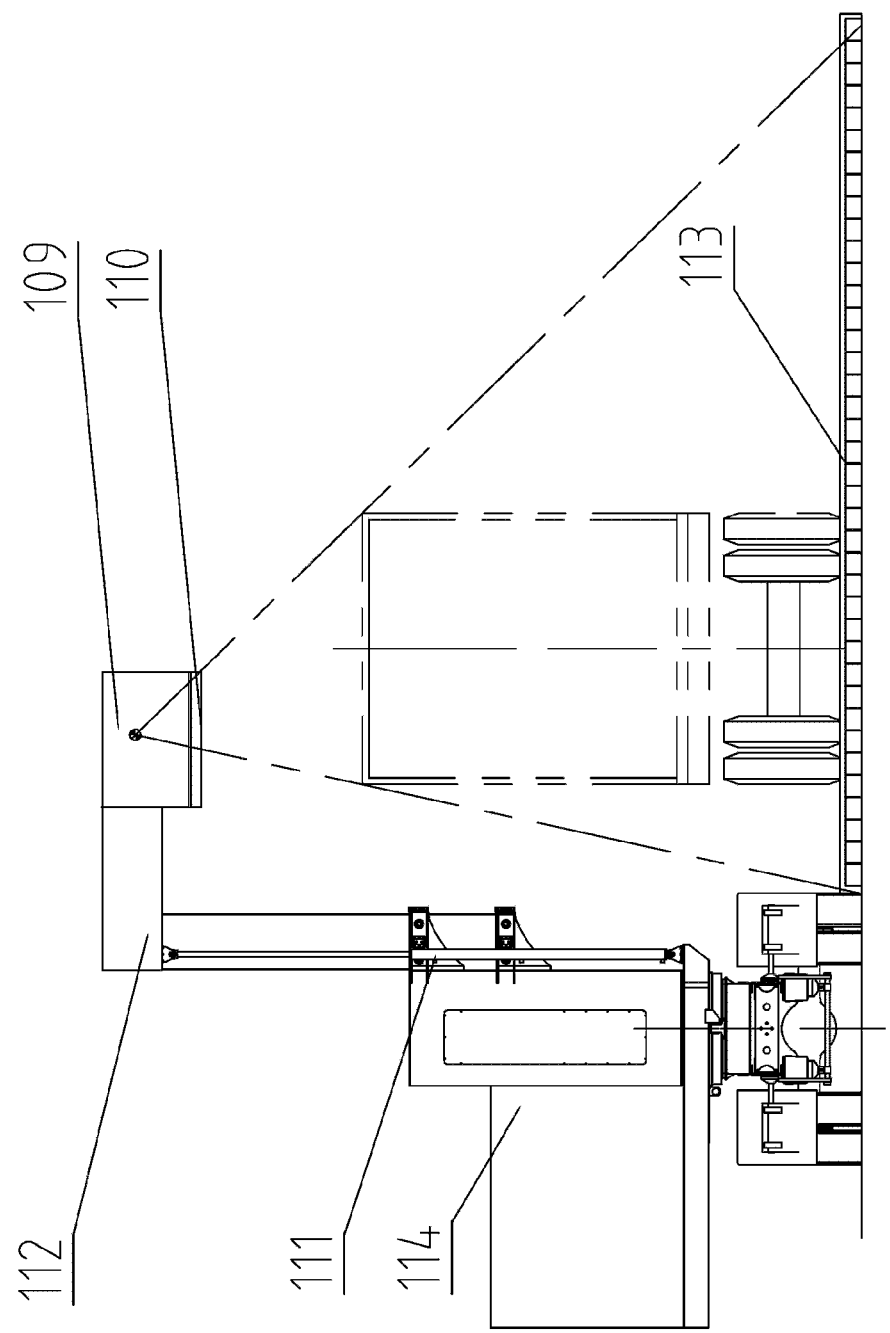
FIG. 3 is a schematic front view of a second imaging device of the vehicle-mounted inspection system according to an embodiment of the present invention, in the scanning state.
Figure 4:
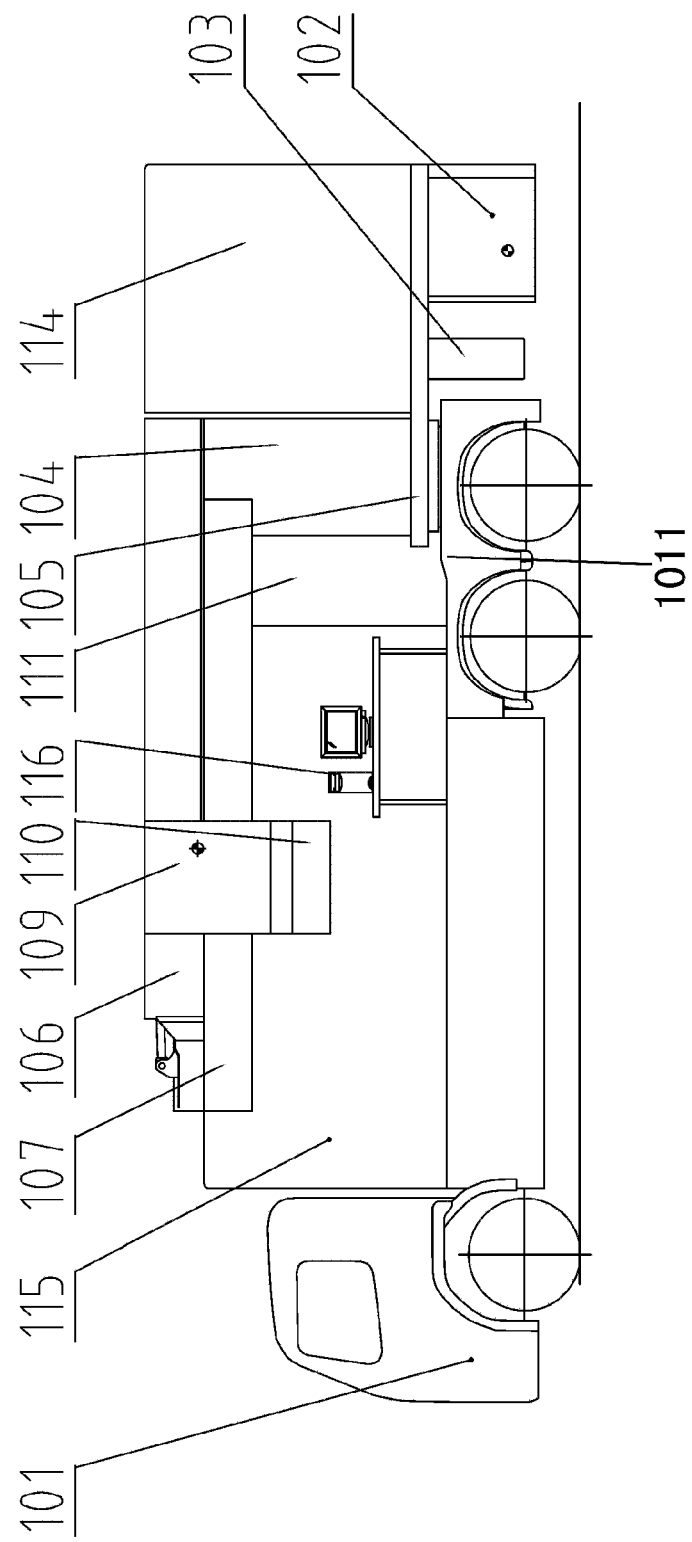
FIG. 4 is a schematic front view of the vehicle-mounted inspection system according to an embodiment of the present invention, in a transport state.
Figure 5:
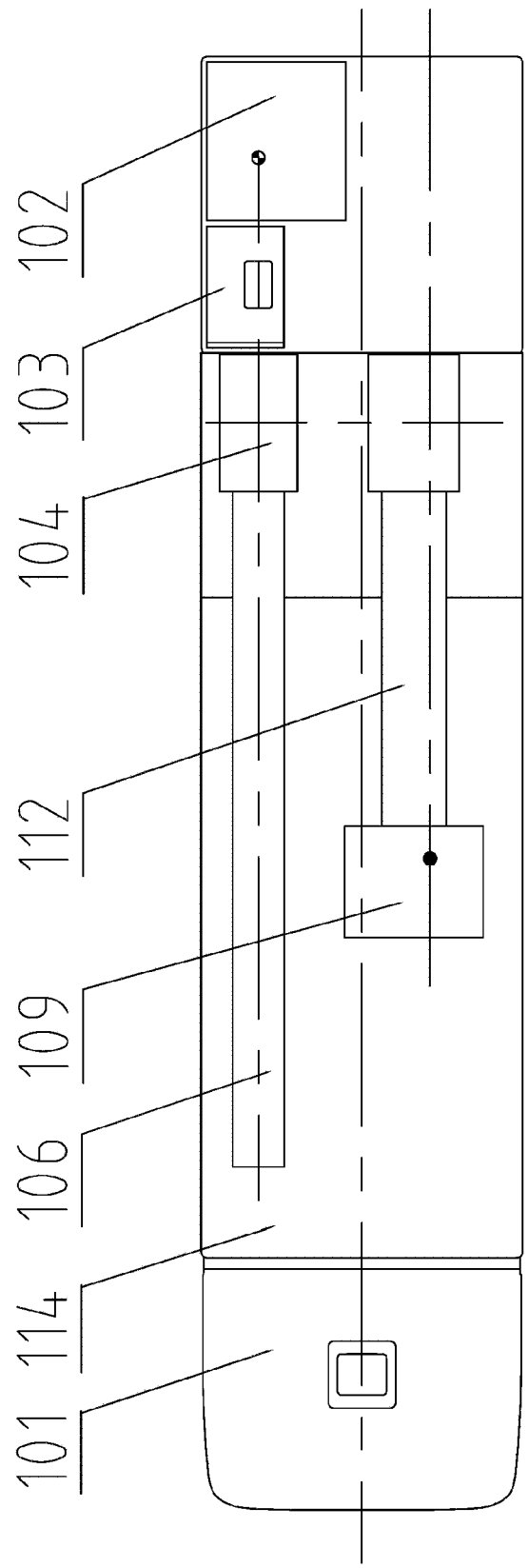
FIG. 5 is a schematic top view of the vehicle-mounted inspection system according to the embodiment of the present invention, in the transport state.

As shown in FIG. 3, the vehicle-mounted inspection system further comprises: a second detection device disposed on a ground surface and configured to receive the ray emitted by the second ray emission device. The second detection device comprises a second detector 113 such as a plate type detector. A second imaging device formed by the second ray emission device and the second detection device is configured to acquire a look-down transmission image of an object under inspection. In the operational state, the object under inspection passes between the second ray emission device and the second detection device, i.e., below the second ray emission device while above the second detection device.

As shown in FIG. 3, the vehicle-mounted inspection system further comprises: a chamber disposed on a front side of the rotation mechanism 105 on the chassis 1011, wherein in the retracted position, the first detection device and the second ray emission device are placed on a top of the chamber and are spaced from each other in a transverse direction of the chassis 1011.

In some embodiments, referring to FIGS. 1A-5, the vehicle-mounted inspection system further comprises: an equipment chamber 114, an operating chamber 115, and an image processing apparatus 116.

The first ray source 102, the first collimator 103 and the equipment chamber 114 are located on one side of the rotation mechanism 105 and are connected to the rotation mechanism 105, while the first elevating mechanism 104, the first transverse detector arm 106 and the first upright detector arm 107 are mounted on the other side of the rotation mechanism 105 and are connected to the rotation mechanism 105. After the equipment reaches a work site, the first imaging device is unfolded in the following sequence. The first elevating mechanism 104 is elevated to drive the first transverse detector arm 106 and the first upright detector arm 107, which are in a folded state, to be elevated to an operating height, then, the rotation mechanism 105 rotates clockwise to the operating position or any other particular angle, and finally, the first upright detector arm 107 is unfolded downwards to the operating position to make an angle of about 90° with a ground surface. After the first imaging device is completely unfolded, the first collimator 103, the first transverse detector arm 106 and the first upright detector arm 107 form a gantry structure. A ray emitted by the first ray source 102 is collimated by the first collimator 103 into a sectorial ray beam having a certain flare angle and emitted from a left side to a right side of the object under inspection. After the sectorial ray beam incident upon a side surface of the object under inspection passes through the object, an attenuated ray signal is received by the first detectors 108 in the first transverse detector arm 106 and the first upright detector arm 107, thereby acquiring information of side-looking transmission image of the object. The object is continuously moved along a length direction of the vehicle relative to the first imaging device, thereby acquiring information of the side-looking transmission image of the object in its full length.

The second elevating mechanism 111 is mounted to the rotation mechanism 105 and has an upper end connected to the second ray source arm 112. The second ray source 109 and the second collimator 110 are mounted to the second ray source arm 112. The second imaging device is unfolded in the following sequence. The second elevating mechanism 111 drives the second ray source 109 to be elevated to an operating height, and then the rotation mechanism 105 rotates clockwise such that the second ray source 109 reaches an upper side over the object under inspection. In order to avoid a ray passing through the object from above the object downwards towards the ground surface from irradiating the vehicle 101 or the operating chamber 115, a center of the second ray source 109 may be located at an upper left side of a scanning passage, rather than a center of the scanning passage. When a scanning is performed, a ray is emitted by the second ray source 109 and is collimated by the second collimator 110 into a sectorial ray beam having a certain flare angle and emitted from above the object to be inspected downwards towards the ground surface. After the sectorial ray beam substantially vertically incident upon a top of the object under inspection passes through the object, it is irradiated onto a second detector 113 mounted on the ground surface temporarily, and an attenuated ray signal is received by the second detectors 113 to acquire information of look-down transmission image of the object. The object is continuously moved along a traveling direction of the vehicle relative to the second imaging device, thereby acquiring information of the transmission image of the object in its full length.

The second detector 113 may comprise a plate type detector with a ramp so that a lorry can pass on the second detector 113 safely and conveniently. The second detector 113 can sustain rolling of a heavy lorry, without being damaged. The second detector can also be mounted and retracted conveniently and quickly.

Accessory equipments of the first ray source 102 and the second ray source 109 are mounted in the equipment chamber 114. An image processing apparatus 116 is mounted in the operating chamber 115, and the operating chamber 116 is a workplace where an operator carries out daily operation and analyzes the image. The operating chamber may also be disposed in a space outside the vehicle-mounted inspection system and data transmission between the equipment in the space and the equipment in the vehicle is achieved by wire communication or wireless communication. The operating chamber 115 has a chamber wall. The chamber wall has a layer of lead (or other shielding material) with a certain thickness for ray shielding purpose, to ensure that a level of ray dose in the operating chamber 115 satisfies requirements of laws and regulations.

In a travel state, a transverse center of gravity of the entire vehicle-mounted inspection system is located in the vicinity of a central axis of the chassis and a longitudinal center of gravity of the entire vehicle-mounted inspection system is located at a rear axle. After the system is unfolded, both the detector arms of the first imaging device and the ray source of the second imaging device cantilever beyond the chassis. Therefore, a corresponding proportional balance weight is loaded in the equipment chamber to ensure that the transverse center of gravity is still located in the vicinity of the central axis of the chassis while the longitudinal center of gravity is still located at the rear axle. The vehicle-mounted inspection system satisfies dynamic and static stability requirements whether in the travel state where the imaging devices are retracted or in the operational state where the imaging devices are unfolded.

A workflow of the inspection system according to the embodiment of the present invention will now be described. The vehicle 101 reaches an appointed work site. The equipment is connected, powered on, and preheated. As described above, the first imaging device, the second imaging device and imaging devices of other viewing angles (if any) are unfolded in place and together to form a multiple viewing angle (the number of viewing angles $n \geq 2$) imaging region. After an object under inspection enters an inspection region, it first enters a first imaging region. In the first imaging region, the object slowly passes below the gantry formed by the first collimator 103, the first transverse detector arm 106 and the first upright detector arm 107. A ray is emitted by the first ray source 102. After the ray incident upon a side surface of the object passes through the object, the ray is received by the first detectors 108, thereby acquiring a first image of the object. After that, the object reaches a second imaging region through the first imaging region. In the second imaging region, a ray is emitted by the second ray source 109. After the ray incident upon a top of the object passes through the object, the ray is received by the second detectors 113, thereby acquiring a second image of the object. After the object completely passes the multiple viewing angle imaging region, entire first, second and other information of image of the object is acquired by the detectors. A data processing and an image reconstruction of the information of image are performed by the image processing apparatus 116. Thereby, multiple viewing angle transmission images of the object can be obtained by single scanning process.

In order to avoid scattering interferences between different ray sources and the detectors, emission of the ray beam and sampling are performed at intervals. During a whole operational period including a first imaging operation and a second imaging operation, when the first ray source emits a ray beam, a first trigger signal is simultaneously transmitted. The first detector performs sampling when receiving the first trigger signal and at the same time the second ray source is interlocked such that the second ray source does not emit a ray beam and thereby the second detector is prohibited from sampling, which ensures that the first detector receives only the attenuated ray emitted by the first ray source and passing through the object under inspection. Likewise, the second imaging device is operated in a similar manner to that of the first imaging device. The two imaging devices perform ray beam emissions and samplings at intervals. In other words, they cooperate and do not interfere with each other. Provided that the system includes more than two imaging devices, the system is operated on the same operational principle as the abovementioned system having two imaging devices. Two or more imaging devices can operate independently of each other or operate simultaneously. For example, the first ray source and the second ray source alternately emit ray beams.

The image data acquired from multiple viewing angles are processed independently of each other, to obtain information of multiple viewing angle image. The information of image acquired from the first viewing angle, the second viewing angle, and the like are displayed on two or more displays, respectively. Profiles and transmission images of the closed object viewed from different viewing angles can be seen clearly and conveniently, for further judging property of the object.

The plurality of imaging devices may simultaneously perform the scanning and imaging on an object from a plurality of viewing angles, or, one or more of the plurality of imaging devices is selectively used to perform the imaging on an object from one or more viewing angles.

The system according to the embodiments of the present invention has two states. One of the two states is a transport state and the other is a scanning state. When the system needs to be transported, all of the ray source arms and the elevating devices are retracted and the detector arms are folded so that the system is switched to the transport state. In this case, overall dimensions of the system completely satisfy road transport requirements. When the system reaches a detection site, all of the arms and the elevating devices are unfolded so that the system is switched to the scanning state. During a scanning, the object passes in the gantry, and the plurality of imaging devices may operate simultaneously, or one or more of the plurality of imaging devices may operate. In order to avoid the influence of unnecessary scattering on image quality, when the plurality of imaging devices operate simultaneously, the plurality of ray sources emit rays from a side of an object, from above, or from another viewing angle at intervals, while the plurality of detectors receive ray signals at the other side of the object, at a bottom, or at another position or from another direction according to ray beam emission signals to the ray sources, respectively, and image reconstruction is performed. Ray transmission images viewed from a plurality of directions or angles are obtained. Thereby, a single scanning process is required in order to obtain whole multiple viewing angle transmission images.

In addition, the system according to the embodiments of the present invention may further comprise a third ray emission device and a third detection device. The third ray emission device may be located on an opposite side to the first ray emission device (i.e., an inner side of the first upright detector arm 107), on the same side as the first ray emission device in an up-down direction or a left-right direction, or on a left, right, front, or rear side of the second ray emission device.

The vehicle-mounted inspection system according to the embodiments of the present invention is, for example, simple in structure, low in cost, and high in inspection efficiency.

The vehicle-mounted inspection system according to the embodiments of the present invention comprises a plurality of ray emission devices and a plurality of detection devices, which acquires transmission images of an object under inspection viewed from a plurality of angles.

In the embodiments, the plurality of imaging devices is mounted to one vehicle. Therefore, transmission images of an object viewed from a plurality of angles are acquired during a single scanning process, and incorrect judgments due to superposition of transmission images of the object are reduced. Transmission images of the object are reflected conveniently, quickly, and genuinely. Inspection quality and inspection efficiency are improved. The system is simple in structure, economic, practical, high in integrity, mobile and flexible.

What is claimed is:

1. A vehicle-mounted inspection system comprising:
   a chassis;
   a rotation mechanism disposed on the chassis;
   a first ray emission device connected to the rotation mechanism and configured to emit a ray from one side of an object under inspection towards the other side of the object under inspection;
   a first detection device connected to the rotation mechanism and configured to receive the ray emitted by the first ray emission device;
   a second ray emission device connected to the rotation mechanism and configured to emit a ray from above the object downwards toward a ground surface;
   a second detection device disposed directly on a ground surface and configured to receive the ray emitted by the second ray emission device;
   a first elevating mechanism connected to the rotation mechanism and configured to raise and lower the first detection device; and
   a second elevating mechanism connected to the rotation mechanism to raise and lower the second ray emission device,
   wherein the first elevating mechanism and the second elevating mechanism are positioned on the chassis adjacent to and spaced from one another in a transverse direction of the chassis with respect to a moving direction of the chassis,
   wherein the rotation mechanism is configured to rotate the first ray emission device, the first detection device and the second ray emission device substantially around an upright axis between a retracted position and an operating position,
   the second ray emission device comprises a ray source arm and a ray source disposed on the ray source arm, and
   the second elevating mechanism is configured to elevate the ray source arm and the rotation mechanism is configured to rotate the ray source arm such that the ray source arm enters an operational state such that the object passes between the second ray emission device and the second detection device during use.

2. The vehicle-mounted inspection system of claim 1, wherein:
   the rotation mechanism comprises: a rotary member, and a driving member configured to drive the rotary member to rotate around the upright axis, and
   the first ray emission device, the first detection device and the second ray emission device are connected to the rotary member.

3. The vehicle-mounted inspection system of claim 1, wherein: the first detection device comprises a traverse detector arm and an upright detector arm, and a plurality of detectors disposed to the transverse detector arm and the upright detector arm, and in the operational state, the transverse detector arm and the upright detector arm are formed in a substantially inverted L shape.

4. The vehicle-mounted inspection system of claim 2, wherein:
   the transverse detector arm is elevated by the first elevating mechanism and is rotated to the operating position by the rotation mechanism so as to enter an operational state.

5. The vehicle-mounted inspection system of claim 1, wherein: the second detection device comprises a plate type detector.

6. The vehicle-mounted inspection system of claim 1, further comprising:
   a chamber disposed on a front side of the rotation mechanism on the chassis,
   wherein in the retracted position, the first detection device and the second ray emission device are placed on a top of the chamber and are spaced from each other in a transverse direction of the chassis.

* * * * *